(No Model.) 7 Sheets—Sheet 1.
G. F. ATWOOD.
ADDING MACHINE.
No. 452,446. Patented May 19, 1891.
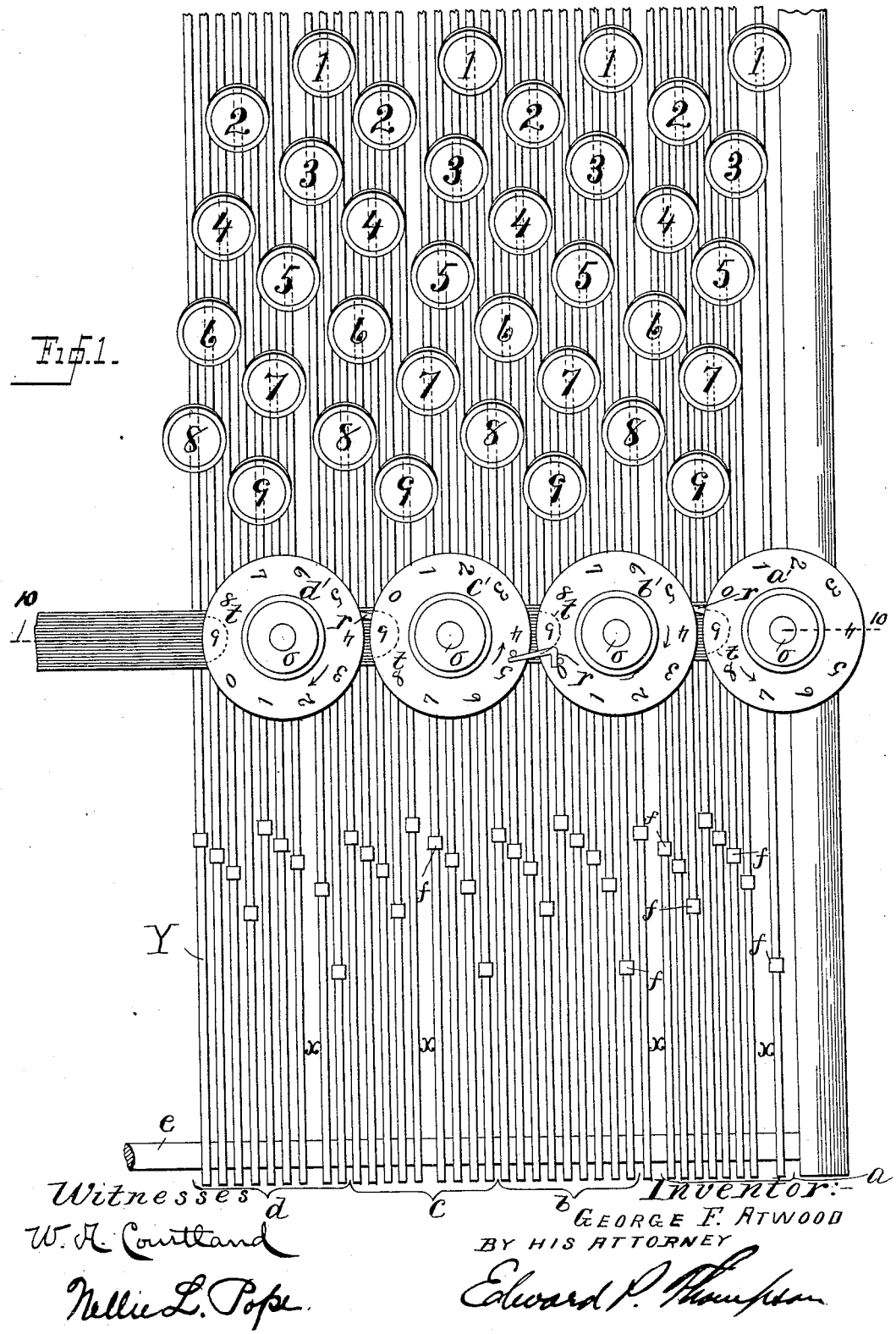
Witnesses
W. H. Courtland
Nellie L. Pope
Inventor:—
GEORGE F. ATWOOD
BY HIS ATTORNEY
Edward P. Thompson (No Model.) 7 Sheets—Sheet 2.
G. F. ATWOOD.
ADDING MACHINE.
No. 452,446. Patented May 19, 1891.
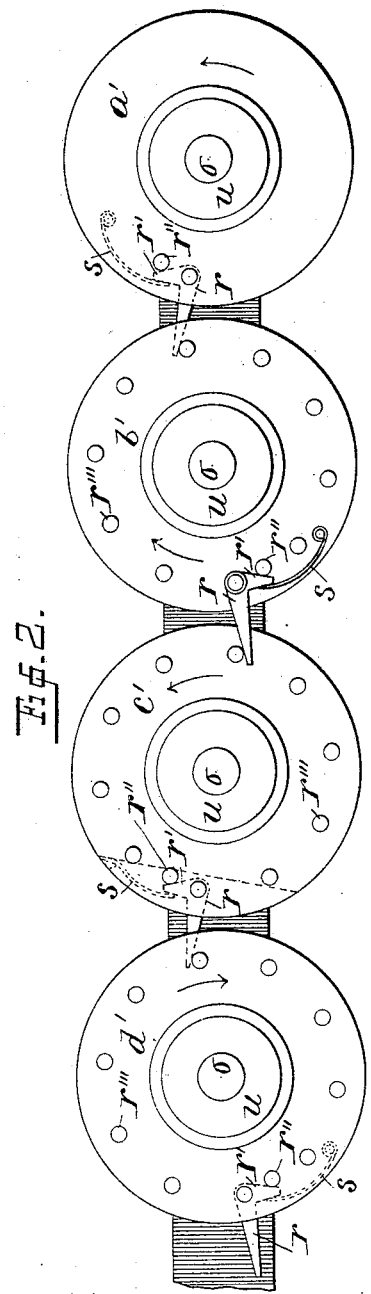
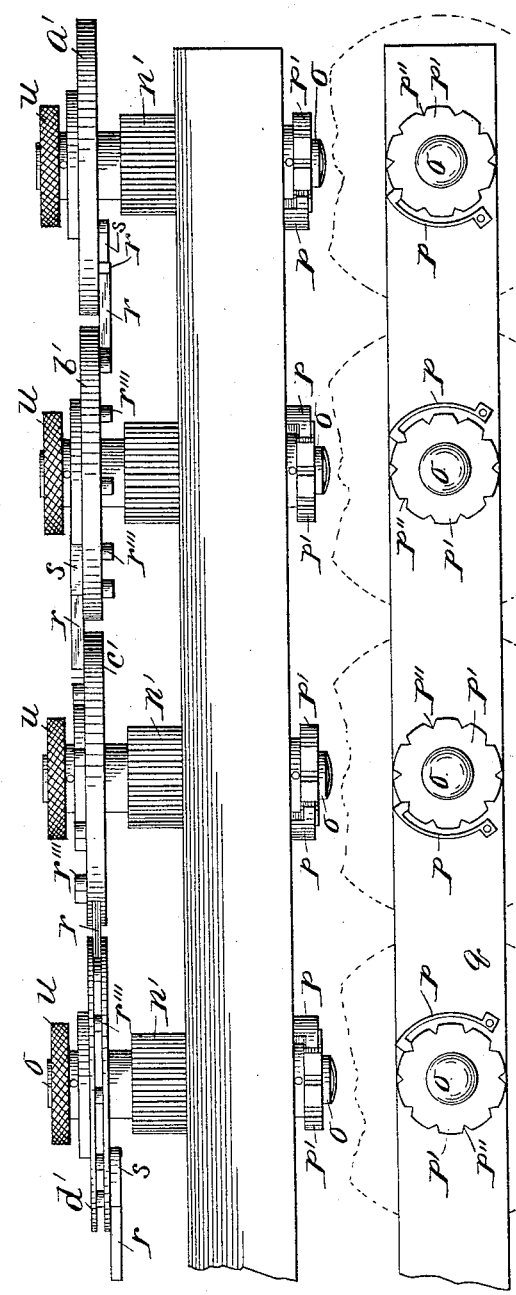
Witnesses:
W. A. Courtland
Nellie L. Pope
Inventor:
GEORGE F. ATWOOD
BY HIS ATTORNEY
Edward P. Thompson (No Model.) 7 Sheets—Sheet 3.
G. F. ATWOOD.
ADDING MACHINE.
No. 452,446. Patented May 19, 1891.
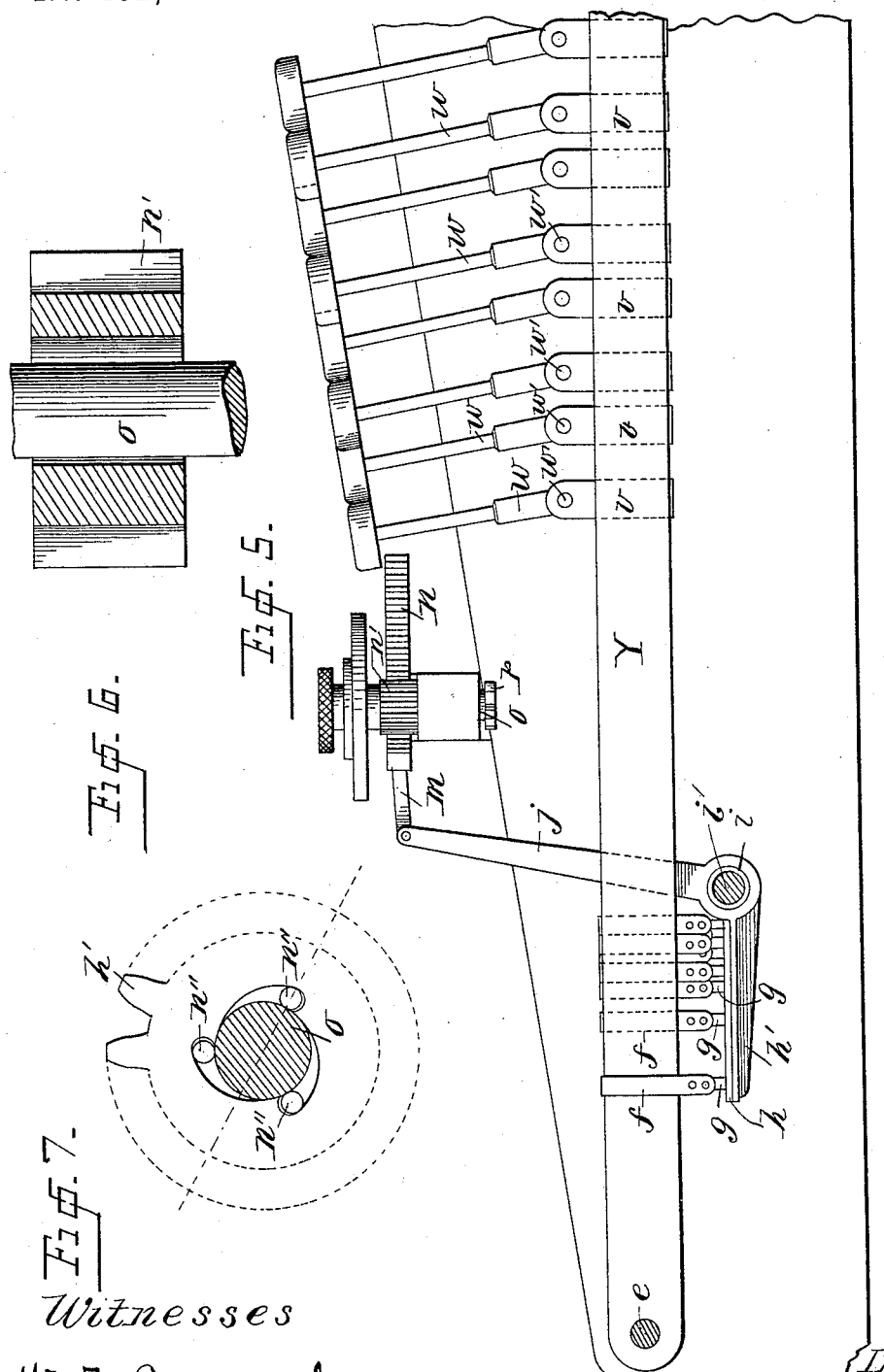
Witnesses
W. A. Courtland
Nellie L. Pope.
Inventor
GEORGE F. ATWOOD
BY HIS ATTORNEY
Edward P. Thompson

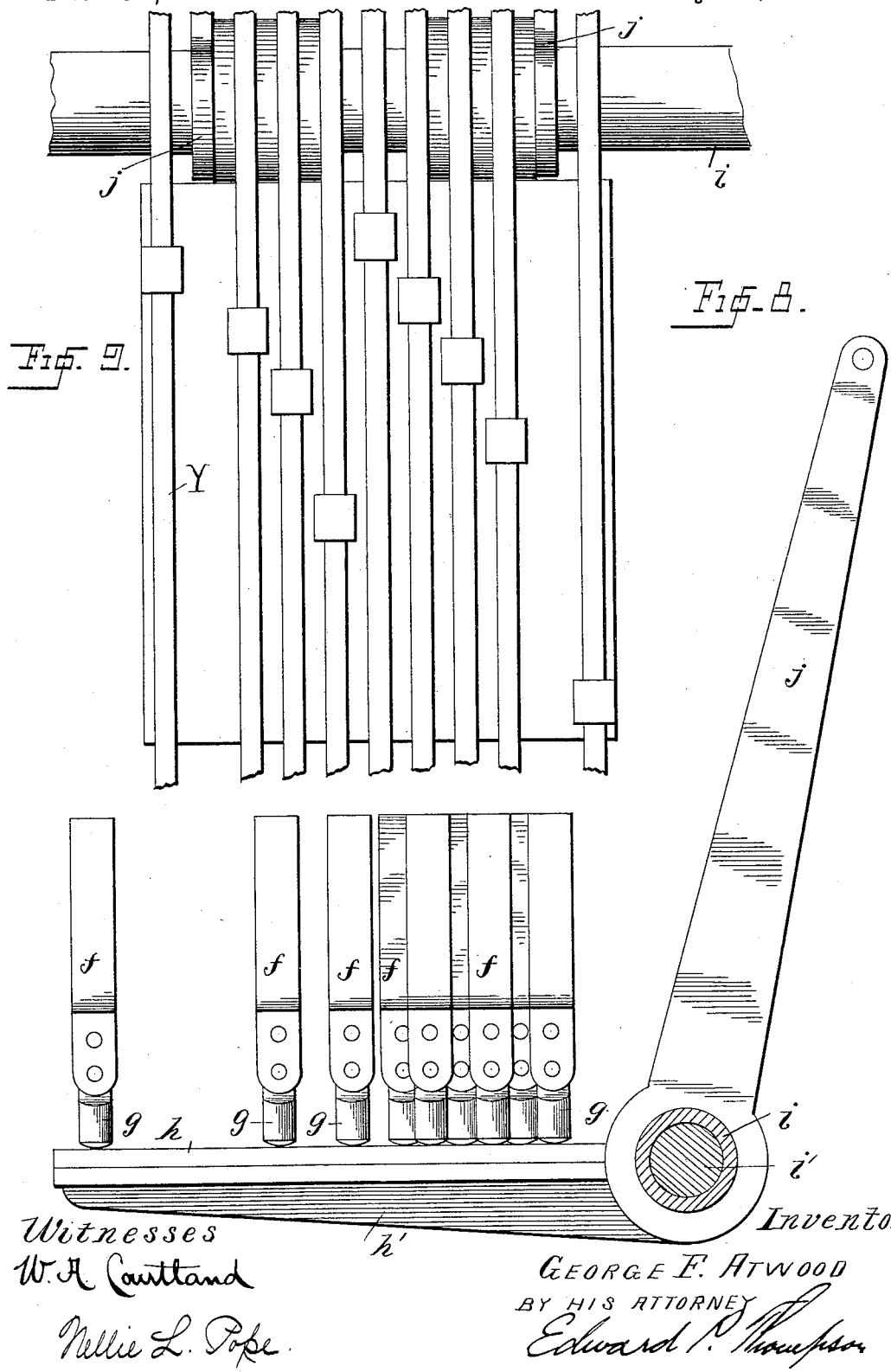

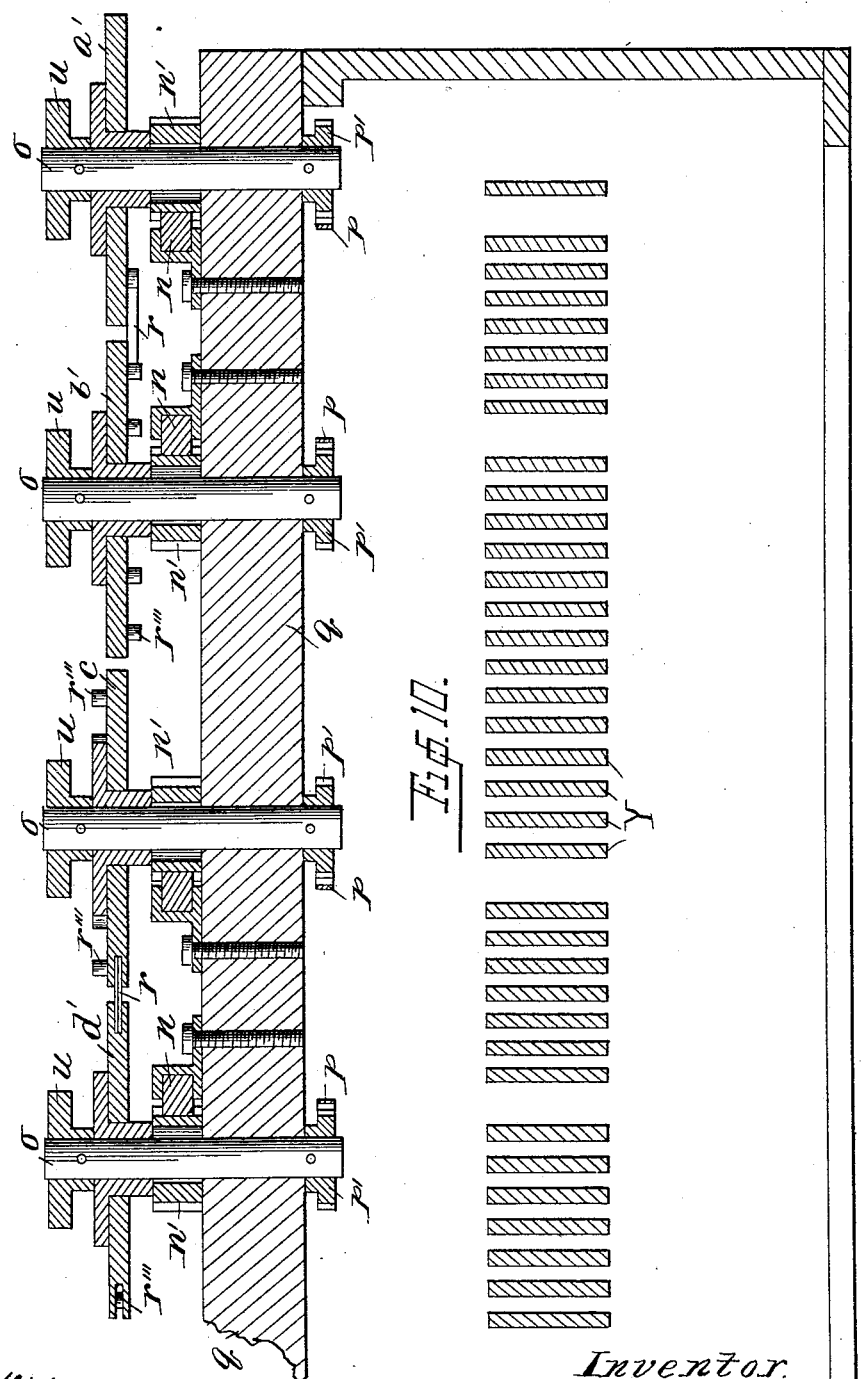

(No Model.) 7 Sheets—Sheet 6.
G. F. ATWOOD.
ADDING MACHINE.
No. 452,446. Patented May 19, 1891.
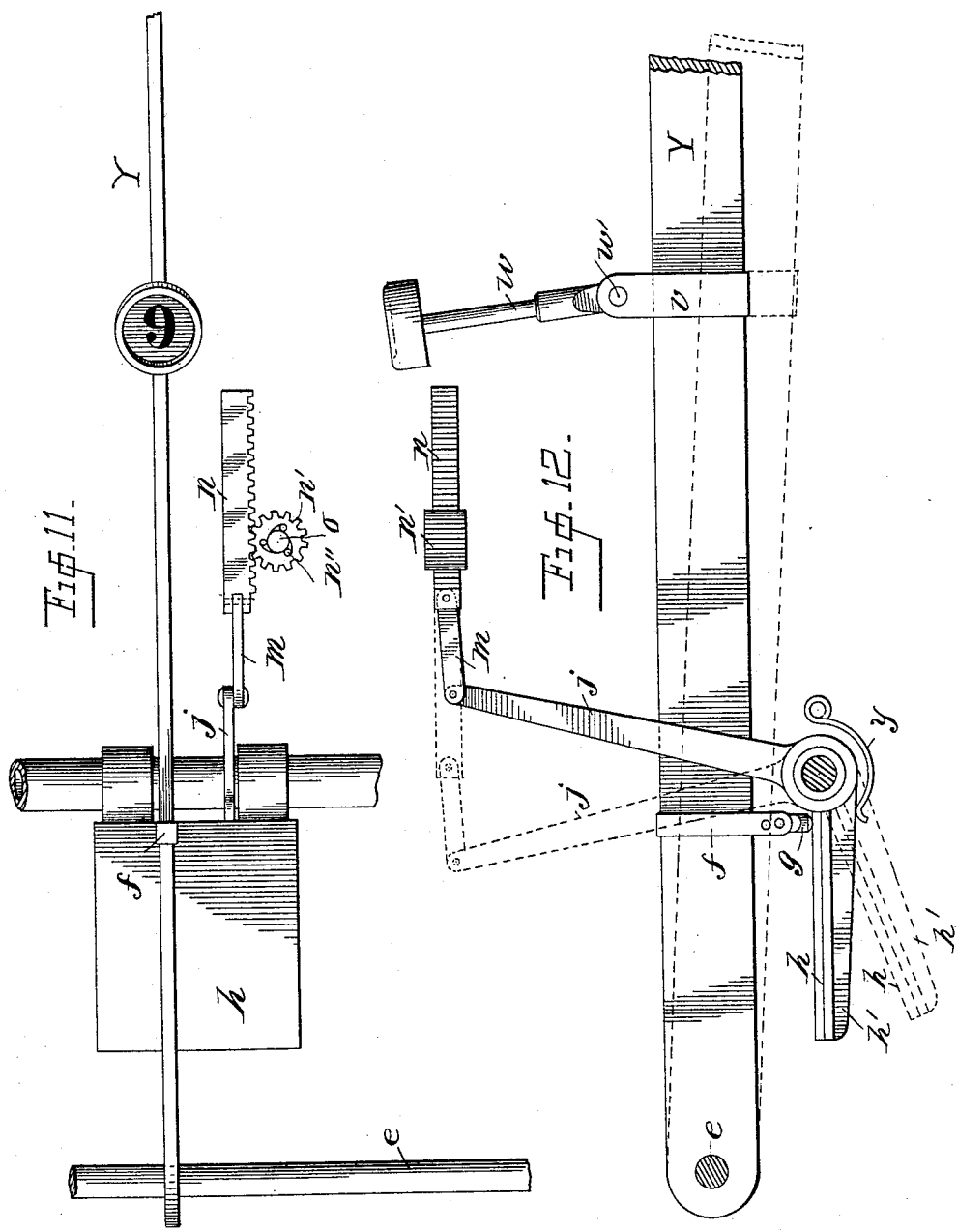
Witnesses:—
W. A. Courtland
Nellie L. Pope
Inventor:—
GEORGE F. ATWOOD
BY HIS ATTORNEY
Edward P. Thompson

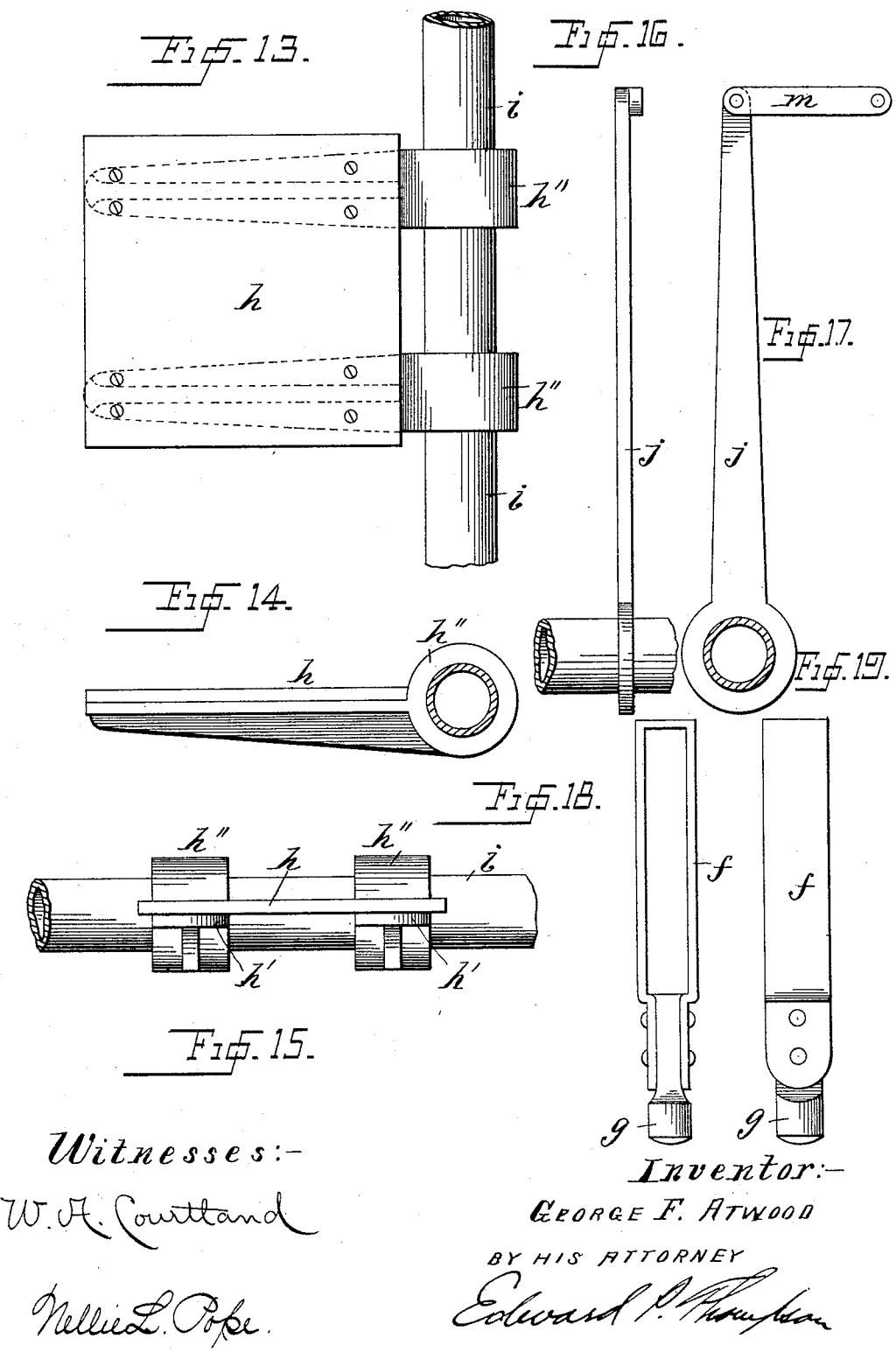

UNITED STATES PATENT OFFICE.

GEORGE F. ATWOOD, OF ORANGE, NEW JERSEY.

ADDING-MACHINE.

SPECIFICATION forming part of Letters Patent No. 452,446, dated May 19, 1891.

Application filed November 12, 1890. Serial No. 371,177. (No model.)

To all whom it may concern:

Be it known that I, GEORGE F. ATWOOD, a citizen of the United States, and a resident of Orange, county of Essex, State of New Jersey, have invented certain new and useful Improvements in Adding-Machines, of which the following is a specification.

My invention relates to a device provided with keys like an ordinary caligraph typewriting machine for adding a column of numbers, each number having as many digits as are usually found among the records of large business-houses.

The object of my invention is to provide such a simple and efficient adding-machine that the same will not easily get out of order and will be easy of rapid manipulation in the process of adding.

The invention in all its details is represented in the accompanying drawings.

Figure 1 is a plan of so much of the device as represents what clearly appears by looking down upon the machine. Certain parts beneath the operating-levers are omitted—for instance, the upward-projecting arms $j$ are omitted, as their construction is clearly explained hereinafter by reference to other figures. In all the figures a portion of the device is supposed to be omitted, as to represent a large and complete device for adding numbers having six or seven digits would cause the figures to be on too small a scale. The omitted part is constructed exactly the same as the part shown. Fig 2 is a view, on an enlarged scale, of the disks in Fig. 1, whereby certain details of construction are distinctly represented. Fig. 3 is a side elevation of devices shown in Fig. 2, showing, also, certain mechanisms which do not appear in Fig. 2. Fig. 4 is a bottom view of devices shown in Fig. 3. The disks in part are represented by dotted lines. The figure shows particularly the pawl and ratchet-wheel for retaining in any given position each disk. Fig. 5 is a side elevation of devices shown in Fig. 1, except that certain parts omitted in Fig. 1 are shown in Fig. 5. Figs. 6 and 7 are sectional views at right angles to each other of a friction-clutch for a pinion shown in Fig. 5. Fig. 8 is a side elevation, on an enlarged scale, of a detail of devices shown in Fig. 5, the detail relating particularly to the crank for communicating motion from the key-levers to the disks, which are provided with the adding numerals. Fig. 9 is a plan view of devices shown in Fig. 8, it being an enlarged view of a portion of the devices shown in Fig. 1, showing a feature which is omitted in Fig. 1. Fig. 10 represents a vertical section at the line 10 10 in Fig. 1, looking toward the keys. Fig. 11 is a plan view of one of the keys, showing by itself the mechanism for communicating motion of the key to the disks, which are provided with numerals. Fig. 12 is a side elevation of devices shown in Fig. 11. The dotted lines represent the new position of the mechanism obtained when the key has been struck and pushed to its lowest position in the process of adding. Fig. 13 is a plan of the means for supporting a plate for communicating motion from the keys and crank to the disks. It is a detail on an enlarged scale of Fig. 11. Fig. 14 is a side elevation of devices shown in Fig. 13, shown partly in section. Fig. 15 is a front elevation of devices shown in Fig. 13. It shows Fig. 13 as looked at in a rectangular direction to the direction obtained in Fig. 14. Figs. 16 and 17 show, on an enlarged scale and in different directions, the upwardly-extending crank-arm and connecting-rod shown in Fig. 12, the said crank having one approximately horizontal arm and a multiple number of arms extending upward. Figs. 18 and 19 are front and side views of the clamp and projection common to the various key-levers.

The device embodying the invention consists of the combination of keys mounted upon pivoted arms or levers, the levers being divided into any number of sets or groups of nine levers each, and the keys being marked with numerals from 1 to 9, inclusive, as represented in the drawings, and the different sets of levers being lettered $a\ b\ c\ d$; a stationary pivot or shaft $e$, upon which the levers operate and turn; clamps $f$, provided each with downward projections $g$, mounted upon the said key-levers for communicating motion from the keys to the next element $h$, which is a plate mounted upon the horizontal crank-arms $h'$, of which there are two for each plate, and which are attached to sleeves $h''$, fixed upon the tube $i$, which is loose upon a fixed shaft or rod $i'$, the said rod $i'$ carrying as many tubes $i$ as there are groups of levers $a$ $b$, &c., the projection $g$ upon the key-lever Y bearing the numeral 1 being nearest to the pivot $e$, and that upon the key-lever Y bearing the numeral 9 being farthest from the pivot $e$, and the other projections being at varying distances, and the said projections $g$ resting upon said plate $h$ in such order as to be the reverse of the order above named, regarding the shaft $i'$ instead of the pivot $e$ for the purpose, as hereinafter described; upwardly-projecting arms $j$, one for each plate $h$ and attached to the tubes $i$ and provided at the upper end with connecting-rods $m$, which are connected to racks $n$, which gear with pinions $n'$, provided with suitable friction-clutch balls or cylinders $n''$, whereby the pinions may turn in one direction independently of the vertical arbor $o$; a pawl $p$ and ratchet $p'$, the former being mounted upon the stationary support $q$ and the latter upon the arbor $o$, there being as many notches $p''$ in the ratchet $p'$ as there are key-levers plus one in each set of levers; disks $a'$ $b'$ $c$ $d''$, mounted, respectively, upon the arbors $o$ and provided with numerals near their peripheries from 0 to 9, inclusive, equally distant from one another; projections $r$, carried by said disks and projecting radially beyond the peripheries thereof and pivoted thereto, said projections being provided with projections $r'$, whose movements are limited by stops $r''$, carried, also, on said disks; retractile springs $s$, acting upon the projections $r'$, tending to hold them against the stops $r''$ and fastened to said disks, Fig. 2 showing the normal positions of the disks, being the same positions as shown in Fig. 1, the dotted lines $t$ representing the position of a hole, whereby the figure 9 on each disk may be seen when the disks are in their normal positions, and other details hereinafter described.

The projections $r$ are mounted on different parts of the disks. One is on the under side of the disk $a'$. One is on the upper side of the disk $b'$. One is in a groove in the periphery of the disk $d'$. The disks $b'$ $c'$ $d'$ are provided with projections near the periphery, equally distant from each other on each disk and lying in the path of the respective projections $r$, and are lettered $r'''$. In the normal position a projection $r$ rests against a projection $r'''$, so that if the disk $a'$ were rotated the distance between any two notches $p''$ in the ratchet $p'$, all the disks would be turned from the positions exhibiting 9 to positions exhibiting zero, the direction of rotation being represented in Figs. 1 and 2 by the arrows on the disks. Any one disk may be turned in the opposite direction by the milled heads $u$, independently of the other disks, because the springs $s$ yield and allow the projections $r$ to turn out of the way of the projections $r'''$.

The keys $w$, bearing numerals 1 2 3 4, &c., are each mounted upon the levers, which may all be represented by Y, in the following manner: Each lever Y carries a clamp $v$, which is attached to a key $w$ by means of rivets $w'$.

In practice it is well to paint all the keys having the large numbers 1 2 3 4, &c., in one group $a$ a different color from those in any other group, so as to assist the operator's eye in striking the number of the proper group.

In Fig. 1 may be seen proportionally wide intervals $x$ between certain key-levers Y. These are for the passage of the arms $j$. The connecting-rod $m$ is pivoted both to the arm $j$ and the rack $n$ loosely, so that the circular motion of the upper end of the lever $j$ may be converted into the rectilinear motion of the rack $n$. The friction-clutch on the pinion $n'$ is so arranged that the arbor $o$ will be clutched when any key Y is pushed downward, but will rotate independently of said arbor when the rack is moved in the opposite direction.

The operation of the device is as follows: The disks are preferably set or adjusted to their normal position by turning the milled heads $u$ so that the figure 9 will appear at the opening $t$ in regard to each disk. Key marked 1 in group $a$ is then struck, thereby turning all the disks to zero, in the manner hereinbefore described.

In order to more clearly describe the operation, let the following example in addition be performed:

$$352$$
$$716$$
$$498$$

It is evident that the sum of the three numbers is equal to the sum of the first two added to the third. Strike the keys corresponding to the digits of each number, reading from the left to the right. Strike key 3 in group $c$. The disk $c'$ is turned to exhibit the numeral 3 thereon at the dotted line $t$, because the clamp $f$, attached to key-lever of the said key 3, is adjusted at the proper distance from the pivot $e$. The arm $j$ corresponding to said key-lever moves the ratchet $m$ under the disk $c'$, turning the pinion $n'$ engaged therewith with the arbor $o$ of said disk. Next strike the key 5 in group $b$. The disk $b'$ will be turned to exhibit the numeral 5 at the dotted line $t$ for reasons exactly similar to those given above with reference to the disk $c'$. Next strike the key 2 in group $a$. The disk $a'$ is turned to exhibit the numeral 2 thereon at the dotted line $t$ in the manner described in reference to $c'$. The number exhibited on the three disks taken together at the dotted lines is 352, which is the first number of the sum to be added. The zero on disk $d'$ remains at the dotted line, because the disk $c'$ has not yet made a complete revolution. Next strike key 7 in group $c$. The disk $c'$ is turned through the distance of seven numerals, which, added to the three exhibited at the dotted lines, will rotate disk $c'$, so that zero will appear at the dotted line. On the approach of zero to the dotted line the projection $r$ of disk $c'$ will rotate the disk $d'$ from its former position of zero, so as to exhibit 1 at the dotted line. Next strike key 1 in group $b$. The numeral 5 will disappear from the dotted line and the numeral 6 will appear. Next strike key 6 in group $a$. The numeral 2 will disappear from the dotted line $t$ and the numeral 8 will appear. The number now indicated at the dotted line, reading from left to right, is 1068. Next strike key 4 in group $c$. The disk $c'$ is turned four spaces, whereby zero will disappear from the dotted line $t$ and 4 will appear. Next strike key 9 in group $b$. The numeral 6 will disappear from the dotted line $t$ and the numeral 5 will take its place. During this operation zero passes the dotted line and therefore the projection $r'$ moves the disk $c'$ through the space of one numeral, so that the numeral 4 disappears from the dotted line at disk $c'$ and the numeral 5 appears. Next strike key 8 in group $a$. The disk $a'$ is turned so that the numeral 8 disappears from the dotted line $t$ and the numeral 6 appears. During the operation zero on disk $a'$ passes the dotted line, turning the disk $b'$ through the space of one numeral, so that the numeral 5 thereon disappears from the dotted line and the numeral 6 appears. The numeral now appearing at the dotted lines, reading from left to right, is 1566, which is the true result.

The clamps $f$ on the levers Y are held by friction, preferably, so that when the instrument is tested and found to be defective in that the disk will not move the proper distance when the keys are struck the said clamps may be moved a little backward or forward until the correct position is reached.

By adding more groups of keys, key-levers, disks $e'$, &c., at the left of Fig. 1, and carrying out the same mechanical construction, the capacity of the adding-machine may be increased so as to add together the longest columns of numbers of several digits each ever found in connection with the largest business establishments.

Retractile springs $y$ are provided pressing against the rotary projections $h'$, so as to return them to their normal position after the corresponding key-levers have been struck.

I claim as my invention—

1. In an adding-machine, the combination of a series of disks provided with indicating-numerals arranged at equal distances around the peripheries and including the numerals 1 2 3 4 5 6 7 8 9 0, a projection located approximately at the zero-mark upon each disk, gearing or engaged with a projection upon each succeeding disk, an arbor for each disk provided with a pinion rotary with the arbor in one direction and loose in the other, a ratchet upon each arbor and provided with ten notches, a pawl engaged with each ratchet, a rack engaged with each pinion and connected by a connecting-rod to a rotary or vibrating arm attached to a tube or sleeve, key-levers pivoted about a common axle and provided with adjustable clamps having projections, the said key-levers being divided into groups of nine each, each group being numbered as to its members from one to nine, inclusive, and as many horizontal projections or plates $h$ to said sleeves as there are groups of key-levers, and as many sleeves as there are of said groups, the said plates being carried by projections or arms $h'$, which are attached to said sleeves, and the said sleeves being rotary and provided with retractile springs $y$.

2. In an adding-machine, the combination of a series of disks provided with indicating-numerals arranged at equal distances around the peripheries and including the numerals 1 2 3 4 5 6 7 8 9 0, a projection located approximately at the zero-mark upon each disk, gearing or engaged with a projection upon each succeeding disk, an arbor for each disk provided with a pinion rotary with the arbor in one direction and loose in the other, a ratchet upon each arbor and provided with ten notches, a pawl engaged with each ratchet, a rack engaged with each pinion and connected by a connecting-rod to a rotary or vibrating arm attached to a tube or sleeve, key-levers pivoted about a common axle, and means—as, for example, a combination of levers—for communicating a predetermined amount of motion from said keys to said sleeves.

In testimony that I claim the foregoing as my invention I have signed my name, in presence of two witnesses, this 10th day of November, 1890.

GEORGE F. ATWOOD.

Witnesses:
J. W. AYLSWORTH,
W. C. MILLER.